United States Patent [19]

Itoh et al.

[11] Patent Number: 4,461,817

[45] Date of Patent: Jul. 24, 1984

[54] ELECTRODE FOR ELECTROLYTE CIRCULATION-TYPE CELL STACK SECONDARY BATTERY

[75] Inventors: Hiromichi Itoh, Tokyo; Takashi Hirose, Zushi; Akira Yamamoto, Yokohama, all of Japan

[73] Assignee: Meidensha Electric Mfg. Co., Ltd., Tokyo, Japan

[21] Appl. No.: 521,393

[22] Filed: Aug. 8, 1983

[30] Foreign Application Priority Data

Aug. 9, 1982 [JP] Japan .................................. 57-137360

[51] Int. Cl.³ .......................................... H01M 4/02
[52] U.S. Cl. ..................................... 429/209; 429/72
[58] Field of Search .................... 429/209, 72, 70, 210

[56] References Cited

U.S. PATENT DOCUMENTS 3,814,631 6/1974 Warszawski et al. .
4,346,150 8/1982 Bellows et al. .
4,421,831 12/1983 Garcia, Jr. ...................... 429/210 X Primary Examiner—Charles F. Lefevour
Attorney, Agent, or Firm—Fleit, Jacobson, Cohn & Price

[57] ABSTRACT

An electrode for an electrolyte circulation-type cell stack secondary battery includes a pair of microchannels for supplying and exciting an electrolyte to or from an electrode member, and each of the microchannels is formed a first hindrance portion having a plurality of wall-shaped projections and a second hindrance portion integrally with a stepped portion in the electrode thickness direction and numerous small cylindrical projections arranged on the stepped portion in a staggered manner with respect to the flow direction of the electrolyte thereby making uniform the flow of the electrolyte on the surface of the electrode member, suppressing the formation of dendrites, making the current density uniform and improving the cell energy efficiency.

4 Claims, 6 Drawing Figures

ELECTRODE FOR ELECTROLYTE CIRCULATION-TYPE CELL STACK SECONDARY BATTERY

BACKGROUND OF THE INVENTION

The present invention relates to an electrode adapted for use in an electrolyte circulation-type cell stack secondary battery.

Generally, a metal-halogen cell, e.g., zinc-bromine cell, one of the cells with which the electrode of this invention can be used, is basically constructed as shown in FIG. 1. The cell comprises a unit cell 1 divided by a membrane (separator) 2 into a positive electrode chamber 3 and a negative-electrode chamber 4, a positive electrode 5 positioned in the positive electrode chamber 3 and a negative electrode 6 positioned in the negative electrode chamber 4. A positive electrolyte is circulated through the positive electrode chamber 3 from a positive electrolyte storage tank 7 by a pump 9 and a negative electrolyte is circulated through the negative electrode chamber 4 from a negative electrolyte storage tank 8 by a pump 10. Numerals 11 and 12 designate valves adapted to open during the charging and discharging, respectively, to circulate the electrolyte.

Practically, a bipolar type of cell stack battery comprising a stack of unit cells of the type shown in FIG. 1 has been in use. FIG. 2 is an exploded perspective view showing an example of the bipolar type of cell stack battery. As will be seen from FIG. 2, the bipolar type of cell stack battery is constructed by alternately stacking a plurality of separating means 17 each having a separator and a plurality of electrode means 18 each having a positive and negative electrode, arranging terminal boards 13a and 13b on both sides of the stack and inserting a bolt 14 through each of bolt holes 19 formed in the respective means thereby holding all the means together as an integral assembly. The terminal board 13a is formed with a positive electrolyte inlet 15 and a negative electrolyte inlet 16 and the other terminal board 13b is formed with a positive electrolyte outlet 15a and a negative electrolyte outlet 16a. Now referring only to the flowing path of the positive electrolyte, the positive electrolyte supplied from the positive electrolyte inlet 15 passing through a manifold 32 formed in each electrode means 18, is introduced into a microchannel 36 of its electrode member 30 through a channel 34, rectified and then supplied to the positive electrode surface of the electrode member 30. Then, the positive electrolyte flows to the positive electrolyte outlet 15a through a microchannel 36a, a channel 34a and a manifold 32a on the outlet side of each electrode means 18 and a manifold 17a of each separating means 17 and is returned to the electrolyte storage tank. The negative electrolyte flows out from the negative electrolyte outlet 16a through another flowing path similarly from the negative electrolyte inlet 16 through the negative electrode side of the respective electrode members 30.

In such circulation of the electrolyte, the flowing velocity becomes extremely nonuniform over the surface of the electrode member 30 with the resulting eddy and stagnation in the section where the electrolyte flows onto the electrode member 30 from the microchannel 36. In the case of the metal-halogen cell, such eddy and stagnation makes the concentration of the electrolyte nonuniform so that an electrochemical reaction on the negative electrode side becomes nonuniform and numerous dendrites are formed on the negative electrode. Such formation of dendrites has the disadvantage of making the current density nonuniform and deteriorating the efficiency of the cell.

SUMMARY OF THE INVENTION

It is the primary object of this invention to provide an electrode for an electrolyte circulation-type secondary cell stack battery, which overcomes foregoing disadvantage in the prior art, maintains the supply of a uniform electrolyte flow to an electrode member without any eddy and stagnation, suppresses the formation of dendrites, makes the current density uniform and improves the current efficiency.

In accordance with the invention there is thus provided an electrolyte circulation-type secondary cell stack battery electrode having an electrode member supported by a frame member, and more particularly an electrode for an electrolyte circulation-type secondary cell stack battery comprising a frame member and an electrode member enclosed by the frame member wherein the electrode member includes a microchannel in each of its electrolyte inlet and outlet sections, the frame member includes a pair of manifolds and a pair of channels each communicating one of the manifolds with one of the microchannels, each of the inlet and outlet microchannels includes a first hindrance portion and a second hindrance portion for the electrolyte flowing respectively, which portions arranged in this order from the channel side of the frame member, the first hindrance portion includes a plurality of projections which width is substantially longer than a depth, thereby the electrolyte flowing direction is changed to lateral direction. The second hindrance portion formed on a stepped portion includes numerous cylindrical projections having a small diameter, thereby the electrolyte flowing is rectified.

DESCRIPTION OF THE PREFERRED EMBODIMENTS

A feature of an electrode according to the invention resides in that in the electrolyte passage for supplying or exitting an electrolyte to or from an electrode member a microchannel consists of a first hindrance portion and a second hindrance portion. The first hindrance portion includes a plurality of projections which width is substantially longer than a depth, thereby the electrolyte flowing direction is changed to lateral direction. The second hindrance portion is formed with a stepped portion in the electrode thickness direction and numerous small cylindrical projections are arranged in a staggered manner over the whole surface of the stepped portion thereby causing the electrolyte to uniformly flow to the electrode member.

The cylindrical projection 44 and the wall-shaped projections 41, 42 have a same height of the frame member 31.

Figure 1:
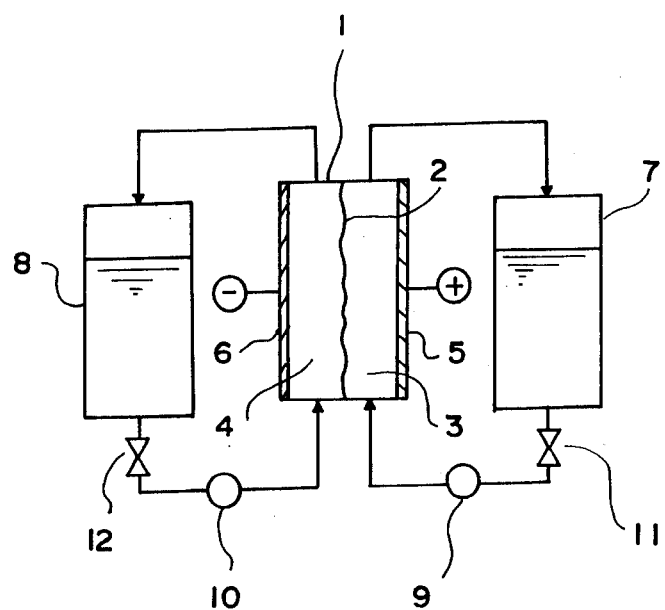
FIG. 1 shows the basic construction of a metal-halogen cell with which is used an electrode according to the invention.
Figure 2:
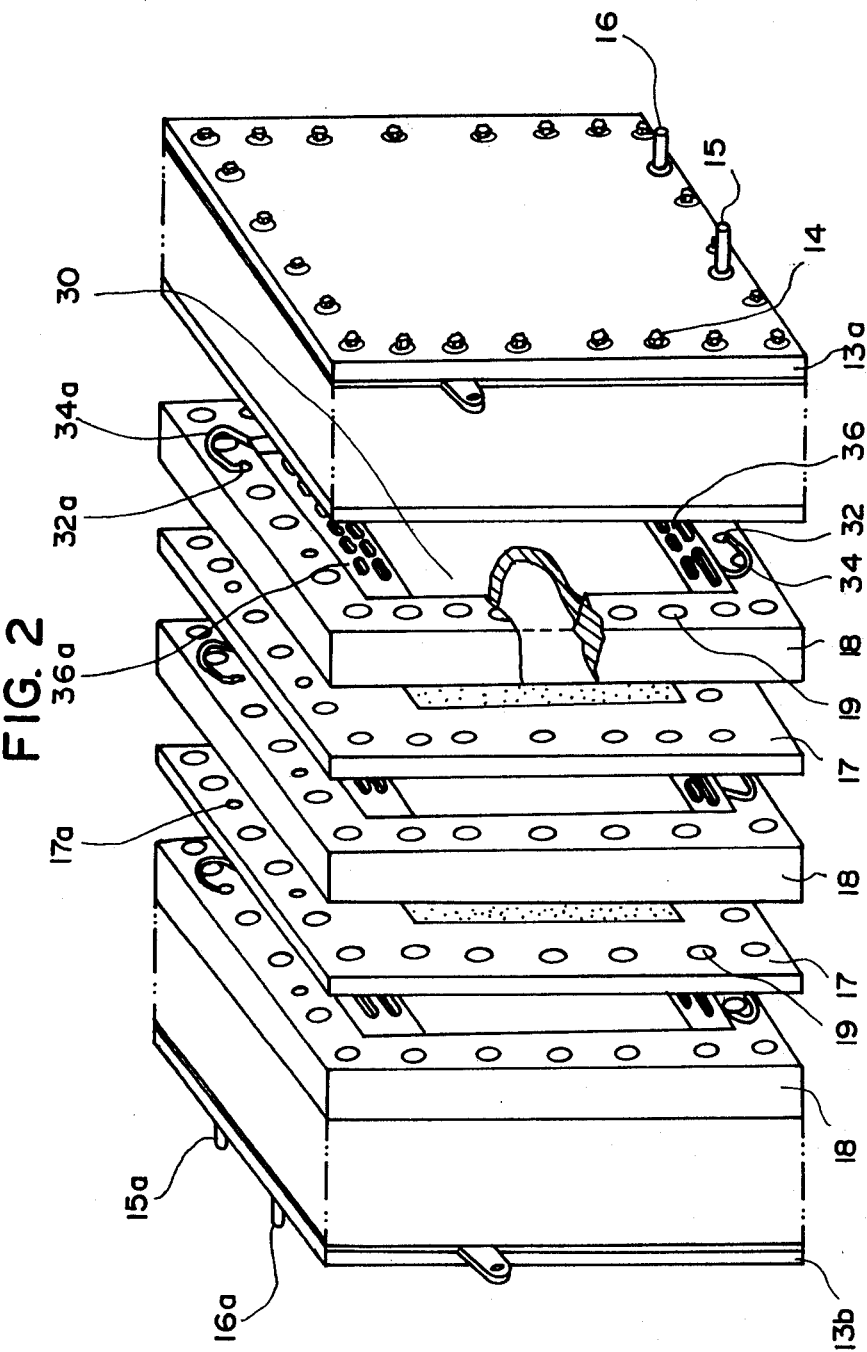
FIG. 2 is an exploded perspective view showing an example of a bipolar type cell stack construction of a plurality of such cells as shown in FIG. 1.
Figure 3:
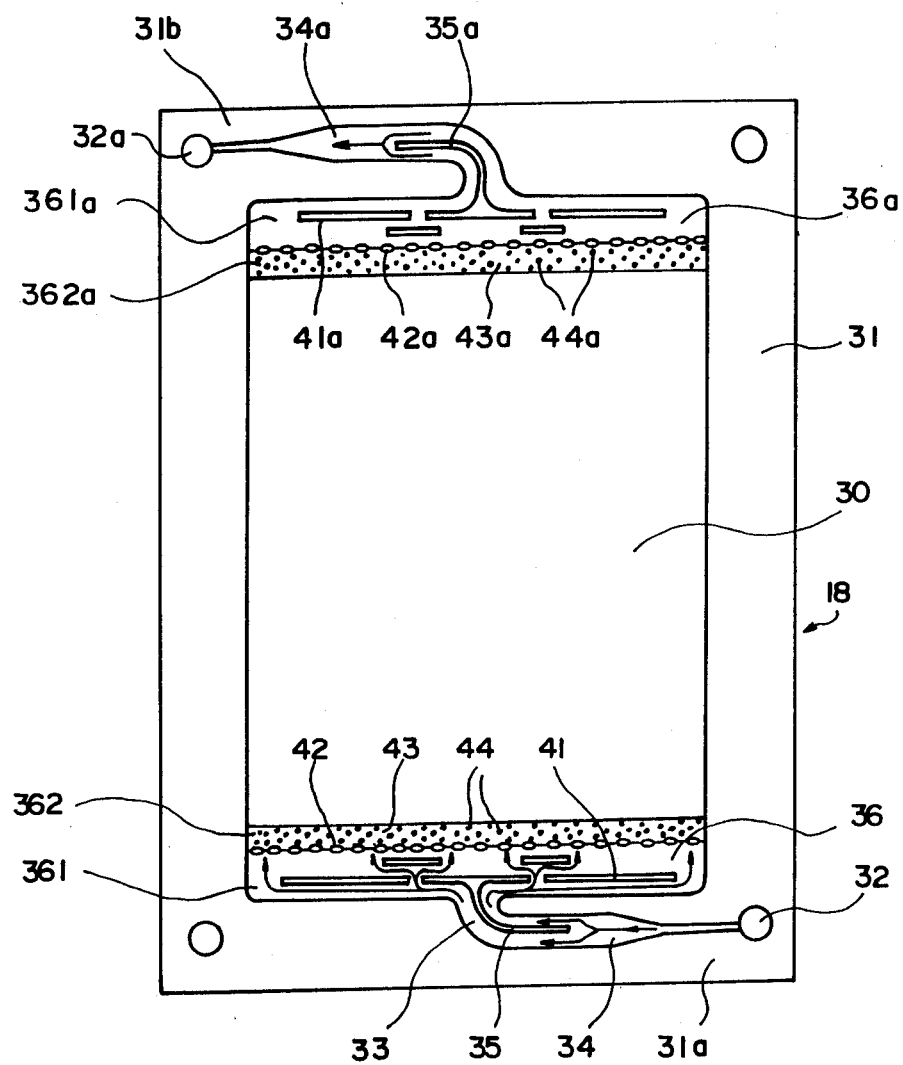
FIG. 3 is a plan view showing the construction of an embodiment of the electrode according to the invention.
Figure 4:
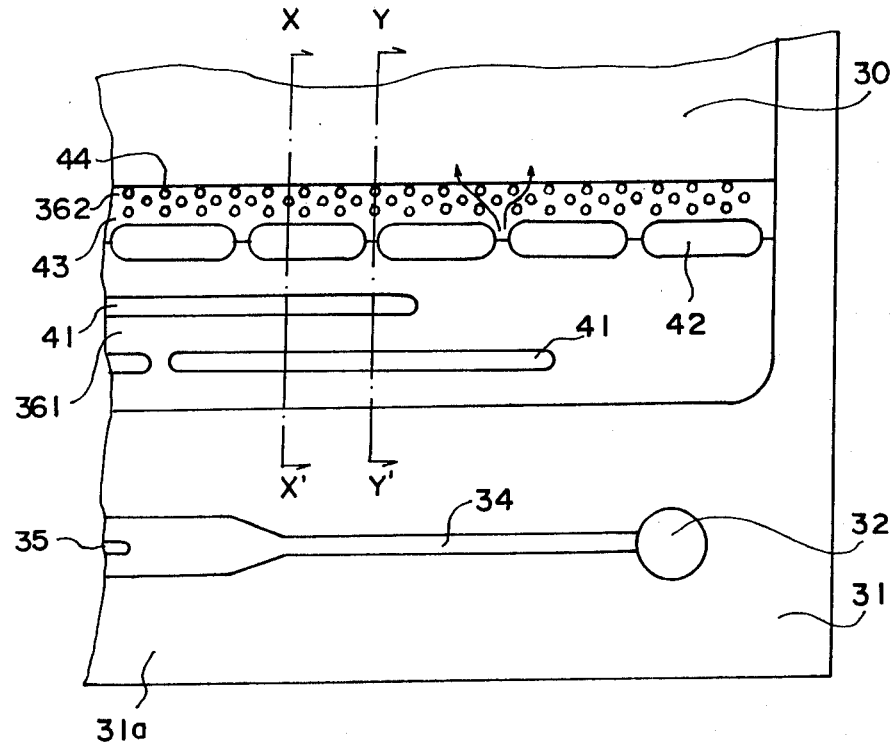
FIG. 4 is a plan view showing the construction of a principal part of FIG. 3.
Figure 5A:
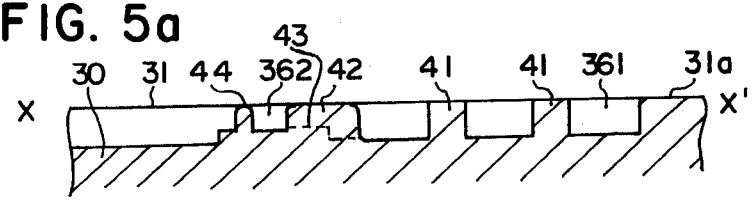
FIG. 5(a) is a sectional view taken along the line X—X' of FIG. 4.

FIGS. 3 to 5 show the construction of an embodiment of the electrode according to the invention which is suitable for use in an electrolyte circulation type secondary battery comprising a plurality of the previously described metal halogen cells arranged in the form of a bipolar type cell stacking construction. In the Figures, the same reference numerals designate the same functions.

In FIGS. 3 to 5, an electrode 18 consists of a frame member 31 and an electrode member 30 enclosed by the frame member 31 and depressed as compared with the surface of the frame member 31. The frame member 31 includes an electrolyte inlet section 31a and an electrolyte outlet section 31b and the inlet and outlet sections 31a and 31b include respectively manifolds 32 and 32a and electrolyte channels 34 and 34a which are respectively connected to the manifolds 32 and 32a. Disposed respectively near the forward ends of the channels 34 and 34a are guide blades 35 and 35a which are each adapted to divide the electrolyte into two flowing parts.

The electrolyte inlet and outlet sections 31a and 31b of the electrode member 30 are respectively formed with microchannels 36 and 36a which are respectively communicated with the channels 34 and 34a, and the microchannels 36 and 36a are respectively formed with the first hindrance portions 361 and 361a and the second hindrance portions 362 and 362a which are arranged in this order from the side of the electrolyte inlet and outlet sections 31a and 31b, respectively. The first hindrance portions 361 and 361a respectively include wall-shaped projecting portions 41 and 41a which are arranged in a staggered manner in the flow direction of the electrolyte and wall-shaped projecting portions 42 and 42a which have a predetermined width and depth, and are arranged uniformly at regular intervals. The second hindrance portions 362 and 362a respectively include stepped portions 43 and 43a formed to step up from the first hindrance portions 361 and 361a, respectively, in the thickness direction of the electrode member 30 and numerous small cylindrical projections 44 and 44a which are arranged in a staggered manner over the whole surface of the stepped portions 43 and 43a, respectively.

The heights of the wall-shaped projecting portions 41, 41a and 42, 42a and the cylindrical projections 44 and 44a are such that they are at least on the same level with each other.

Next, the flow of an electrolyte in the electrode of the invention will be described. The electrolyte supplied from the manifold 32 through the channel 34 is divided into two flowing parts as shown by the arrows in FIG. 3 by the guide blade 35 disposed in the channel 34. Thus, the electrolyte flows into the microchannel 36 through near a central portion 33 of the electrolyte inlet section 31a of the frame member 31 and then the electrolyte flows into the electrode member 30 through the first hindrance portion 361 and the second hindrance portion 362. Then, the electrolyte flows to the manifold 32a through the second hindrance portion 362a and the first hindrance portion 361a of the electrolyte outlet microchannel 36a and the channel 34a.

In more detail description of the electrolyte flowing situation, each two divided electrolytes flows from the central portion 33 to the first hindrance portion respectively and during the electrolyte passing through the first hindrance portion the electrolyte flows to lateral and forward directions, thereby the electrolyte uniformly supplies over the lateral direction of whole width of the electrode to the stepped portion which includes a plurality of the equiwidth wall-shaped projections 42, but the width of the projection 42 is substantially smaller than that of the projection 41, one side of the projection 42 locates on the stepped portion 43 and another side of the projection 42 locates on the first hindrance portion 361. The projections 42 is arranged uniformly at predetermined interval. Then the electrolyte flows through an opening between the wall-shaped projections 42 as such a manner the electrolyte flowing direction is changed from the horizontal direction to the vertical direction with respect to the electrode surface at the stepping up portion as shown FIG. 5(b), and then the electrolyte is uniformly distributed by the numerous small cylindrical projections 44 on the second hindrance portion 362 and simultaneously rectified electrolyte flows to the surface of the electrode member 30 in the form of a parallel and equivelocity flow.

Figure 5B:
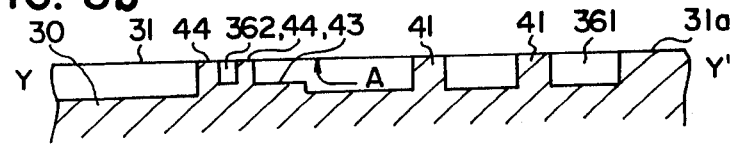
FIG. 5(b) is a sectional view taken along the line Y—Y' of FIG. 4.

Thus, due to the provision of the stepped portion 43 stepping up in the thickness direction of the electrode means 18 and the staggered projections 44 at least in the microchannel 36 on the electrolyte inlet side, the electrolyte emerging from the microchannel 36 is changed from the horizontal flow to a vertical flow as shown by an arrow A in FIG. 5(b) and hence the electrolyte is distributed over the whole width of the stepped portion 43. As a result, the diffusion of the electrolyte flow is made easier and thus the electrolyte is supplied to the surface of the electrode member 30 with both a uniform flow velocity and a uniform flow rate distribution.

As a result, the electrolyte flow which is uniform and involving no stagnation is supplied to the electrode member 30 and the formation of dendrites is suppressed. This has the effect of making the current density uniform and improving the cell energy efficiency. Also, there is the effect of increasing the effective electrode area, increasing the energy density, enhancing the cell performance and increasing the cell life.

While, in the above-described embodiment, the manifolds 32 and 32a are formed in the base portions, they may be formed in the side portions. Further, the guide blades 35 and 35a in the channels 34 and 34a may be eliminated.

What is claimed is:

1. An electrode for an electrolyte circulation-type secondary cell stack battery in which an electrode member is supported by a frame member comprising:
    a frame member;
    an electrode member enclosed by said frame member;
    a microchannel formed in each of electrolyte inlet and outlet sections of said electrode member;
    a pair of manifolds formed in said frame member; and
    a pair of channels each thereof being formed in said frame member to communicate one of said manifolds with one of said microchannels;
    said microchannel in said inlet section including a first hindrance portion and a second hindrance portion arranged in this order from the side of said inlet-section frame member channel;
    said first hindrance portion including a plurality of wall-shaped projections;

said second hindrance portion including a stepped portion extending beyond said first hindrance portion in a thickness direction of said electrode and a plurality of projections arranged in a staggered manner over a whole surface of said stepped portion.

2. An electrode according to claim 1, wherein said microchannel in said outlet section includes another first hindrance portion and another second hindrance portion arranged in this order from the side of said outlet-section frame member channel, and wherein;

said another first hindrance portion includes a plurality of other wall-shaped projections;

said another second hindrance portion includes another stepped portion extending beyond said another first hindrance portion in the thickness direction of said electrode and a plurality of other projections arranged in a staggered manner over a whole surface of said another stepped portion.

3. An electrode according to claim 1, wherein said projections have a same height with said frame member.

4. An electrode according to claim 1, wherein said first hindrance portion includes a plurality of first wall-shaped projecting portions arranged in a staggered manner and a plurality of second wall-shaped projecting portions arranged uniformly at predetermined intervals with respect to a flow direction of said electrolyte.

* * * * *